United States Patent [19]
Nakamura et al.

[11] Patent Number: 4,787,003
[45] Date of Patent: Nov. 22, 1988

[54] STEP-UP TYPE MAGNETIC HEAD

[75] Inventors: Kazuo Nakamura, Toyonaka; Ken Takahashi, Suita, both of Japan

[73] Assignee: Matsushita Electric Industrial Co., Ltd., Osaka, Japan

[21] Appl. No.: 851,518

[22] Filed: Apr. 14, 1986

[30] Foreign Application Priority Data

Apr. 18, 1985 [JP] Japan .................................. 60-83165

[51] Int. Cl.$^4$ .......................... G11B 5/17; G11B 5/31; G11B 5/127; H01F 17/06
[52] U.S. Cl. .................................... 360/123; 360/125; 360/126; 360/110; 336/175; 336/184
[58] Field of Search ............................. 360/123–126, 360/128, 110, 108; 336/174, 175, 184

[56] References Cited

U.S. PATENT DOCUMENTS

| | | | |
|---|---|---|---|
| 2,585,065 | 2/1952 | Wiegand | 360/123 |
| 3,055,987 | 9/1962 | Ricketts | 360/104 |
| 3,344,237 | 9/1967 | Gregg | 360/126 |
| 3,546,565 | 12/1970 | Downing et al. | 336/175 X |
| 3,660,617 | 5/1972 | Hagopian | 360/123 |
| 3,789,158 | 1/1974 | Walker et al. | 360/123 |
| 3,987,487 | 10/1976 | Berger | 360/123 |
| 3,996,543 | 12/1976 | Conner et al. | 336/174 X |
| 4,402,027 | 8/1983 | Nakamura et al. | 360/123 |

FOREIGN PATENT DOCUMENTS 53-16687  6/1978  Japan .
1494087  12/1977  United Kingdom ............... 360/127

Primary Examiner—Stuart N. Hecker
Assistant Examiner—Benjamin E. Urcia
Attorney, Agent, or Firm—Stevens, Davis, Miller & Mosher

[57] ABSTRACT

A magnetic head integrally assembled with a step-up transformer. The magnetic head portion is formed on a lower substrate by a thin film technology and the number of turns of the signal winding is 1 or a value near 1. The transformer portion mainly comprises a transformer magnetic circuit which is formed by the lower substrate and upper substrate. A one-turn primary coil of a thin film formed over the lower substrate and a secondary coil by a bulk wire are arranged so as to couple inductively with each other through the transformer magnetic circuit. The signal winding and the primary coil winding are formed by the same thin film process. The head portion and the transformer portion thus are arranged very closely and hence coupled with very little transfer loss of signal.

5 Claims, 3 Drawing Sheets

STEP-UP TYPE MAGNETIC HEAD

BACKGROUND OF THE INVENTION

The present invention relates to a magnetic head in which a step-up transformer is integrally assembled and, more particularly, to a magnetic head having a video head shape.

Hitherto, a head arrangement in which a step-up transformer is coupled to an inductive head of one turn (or a few turns) has been known. This kind of magnetic head is shown in FIG. 1. According to such an arrangement, by extremely reducing the number of signal windings and miniaturizing the magnetic circuit interlinked therewith, the output per turn is increased. The low absolute output due to a small number of windings is compensated by the step-up transformer. FIG. 2 shows a conventional example which is suitable for use as a video head. In FIG. 2, reference numerals 1 and 2 denote magnetic head cores which confront one another to form a head gap 3; and 4 indicates a half body of a transformer core. This half body is disposed to face the rear portion of the head core 1, thereby forming a transformer core of a substantially ring-shaped magnetic path. A metal layer 5 is embedded into a groove formed to divide the head core 2 into a front gap portion and a back gap portion. A coil 6 of one turn passes through a central groove 7 of the transformer core 4. The edge portion of the coil 6 is connected to the edge portion of the metal layer 5, thereby forming a closed loop coil of one turn which interlinks the head magnetic circuit and transformer magnetic circuit. A secondary coil 8 of the transformer is provided. In this manner, a head arrangement which is equal to FIG. 1 is obtained.

According to such a head structure, the head core portion and the one-turn winding are provided in a so-called bulk constitution. Consequently, such a head arrangement has the following problems. Namely, the one-turn inductance and DC resistance of the head cannot be sufficiently reduced by sufficiently decreasing the size of the head magnetic circuit and one-turn winding. Further, since the arrangement of the primary and secondary coils of the transformer section is not proper, a sufficiently high coupling coefficient of the transformer cannot be obtained. The following explains why the above problems obstruct realization of a highly efficient head.

A circuit shown in FIG. 3 will now be considered as a simple equivalent circuit of the head of FIG. 1. The DC resistance and stray capacitance of the secondary coil are omitted in this circuit. $L_1$ and $L_2$ denote self-inductances of the primary and secondary coils of the transformer, respectively. M denotes a mutual inductance between the primary and secondary coils; $L_H$ is an inductance of the one-turn head; r a DC resistance of one turn including both the winding of the head and the winding of the primary coil of the transformer; $E_i$ a reproduced voltage which is induced in the head winding; and $E_0$ a secondary output of the transformer.

The significant factors in the actual use of such a head are the inductance L, real part Re(Z) of the impedance and transfer efficiency $G = E_0/E_i$ of the whole structure including the head and the transformer.

The high frequency operational range of the head is determined by L. When the frequency is sufficiently high, the value of L can be calculated by the following expression from FIG. 3.

$$L = L_H \cdot N^2 + L_2(1 - K^2) \quad (1)$$

where N is a number of secondary coil windings (i.e., step-up ratio) of the transformer and K is a coupling coefficient of the transformer. Although the first term $(L_H \cdot N^2)$ of expression (1) is the inductance which is inevitably generated irrespective of the performance of the transformer, the second term is the amount which is added when the transformer is not ideal. Since it is necesary to set N to a value as large as possible for the value of L which can be allowed in use, $L_H$ needs to be set to a sufficiently small value. In addition, it is necessary to minimize the second term of expression (1) by setting K to a value sufficiently close to "1" by increasing the coupling degree of the transformer.

Next, the impedance noise is determined by Re(Z) and a lower value of Re(Z) is better. At a frequency higher than the low-band cut-off frequency, Re(Z) can be calculated by the following expression.

$$Re(Z) = \frac{r \cdot K^2 \cdot L_1 \cdot L_2}{(L_H + L_1)^2} \quad (2)$$

Assuming that $L_H$ is smaller than $L_1$, expression (2) can be approximated by the following expression.

$$Re(Z) \simeq r \cdot K^2 \cdot \frac{L_2}{L_1} \simeq r \cdot K^2 \cdot N^2 \quad (3)$$

The one-turn resistance value r on the primary side is nearly transformed into the value multiplied by the square of the step-up ratio, i.e., $rN^2$ on the secondary side. Therefore, r needs to be set to a sufficiently low value.

Further, the transfer efficiency G becomes $$G = E_0/E_i = K \cdot N \cdot \frac{L_1}{L_H + L_1} \quad (4)$$

at a frequency above the low-band cut-off frequency. Assuming that $L_H$ is smaller than $L_1$ similarly, $$G \simeq K \cdot N \quad (5)$$

The transfer efficiency is reduced by the value of K from the step-up ratio N. Therefore, K needs to be set to a value sufficiently close to "1".

To obtain the high performance characteristics of the head including the step-up transformer as mentioned above, it is required that the inductance and DC resistance of the one-turn portion of the head be sufficiently small and the coupling coefficient of the transformer be sufficiently close to "1". These conditions are not fully satisfied in the conventional example.

SUMMARY OF THE INVENTION

It is an object of the present invention to provide a magnetic head of the step-up type which can satisfy the required conditions of a high step-up ratio for a given inductance, a low resistance and a small impedance noise, and a high transfer efficiency.

A step-up type magnetic head according to the present invention comprises: a thin-film head magnetic circuit formed on a lower substrate; a transformer magnetic circuit which includes in at least a part thereof a magnetic thin film formed on the lower substrate and which is constituted together with an upper substrate; a thin film coil of a closed loop formed over the lower substrate so as to interlink both the head magnetic circuit and the transformer magnetic circuit; and a transformer secondary coil which is in interlinkage with the transformer magnetic circuit, the secondary coil being divided into a first portion wound around the upper substrate and a second portion wound around the lower substrate and being balance wound by means of a bulk winding.

With this constitution, the head magnetic circuit portion and head signal winding portion can be formed by thin film technology and can be miniaturized to the necessary minimum sizes. Thus, the head inductance and the DC resistance of the signal winding can be minimized. In addition, since the secondary coil of the transformer has a balance winding constitution, the primary and secondary coils can be more densely coupled and the coupling coefficient K can be enlarged. In this manner, the construction in accordance with the present invention results in an increase of N for the given inductance L, reduction of Re(z) and a realization of a transformer efficiency which is very close to the step-up ratio.

DESCRIPTION OF THE PREFERRED EMBODIMENTS

Embodiments of the present invention will now be described hereinbelow with reference to FIGS. 4 to 9.

Figure 1:
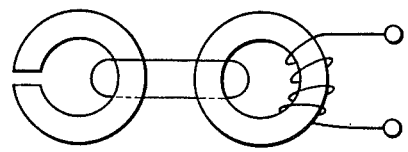
FIG. 1 is a plan view showing the principle of a step-up type magnetic head.
Figure 2:
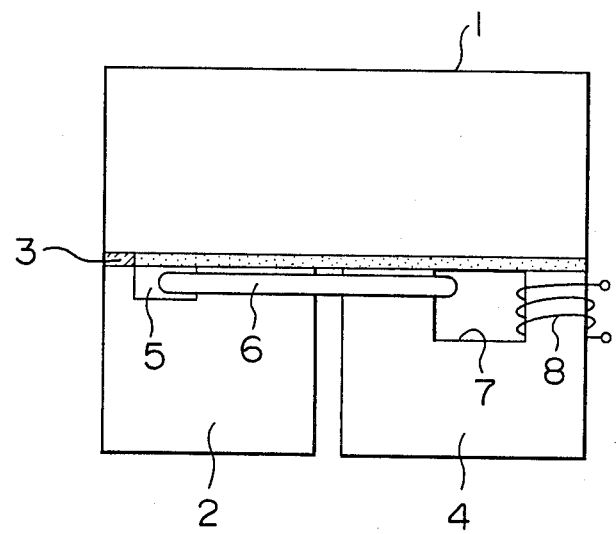
FIG. 2 is a plan view showing a conventional example of a step-up type magnetic head.
Figure 3:
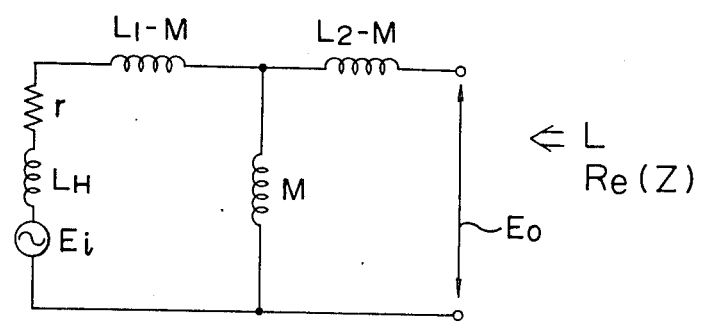
FIG. 3 is a diagram showing an equivlent circuit of a step-up type magnetic head.
Figure 4:
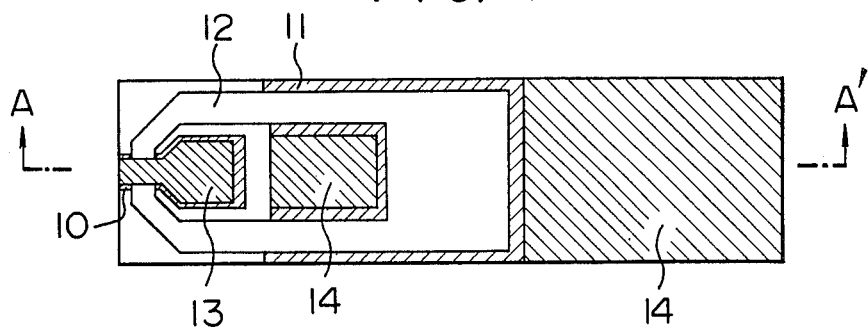
FIG. 4 is a plan view showing one embodiment of the present invention.
Figure 5:
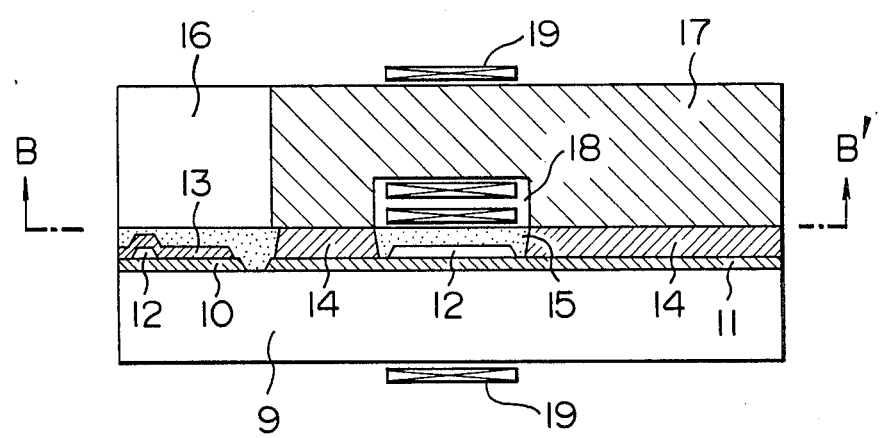
FIG. 5 is a cross sectional view taken along line A—A' in FIG. 4.

FIGS. 4 and 5 show a magnetic head of the invention. FIG. 4 is a plan view and FIG. 5 is a cross sectional view taken along line A—A' in FIG. 4. In FIG. 4, the portion of the head over line B—B' in FIG. 5 and a secondary coil of a transformer are omitted for convenience of drawing.

In FIGS. 4 and 5, reference numeral 9 denotes a non-magnetic lower substrate. A lower head core 10 and a lower transformer core 11 are formed on the lower substrate 9 by magnetic thin film in the pattern shown, respectively. A one-turn coil 12 formed of a closed loop thin film is formed so as to be insulated from the magnetic thin films 10 and 11 as shown in the diagram. The portion of the coil 12 near the head magnetic circuit constitutes the one-turn signal winding of the head. On the other hand, the portion of the coil 12 near the transformer magnetic circuit constitutes a primary one-turn winding of the transformer. Next, a non-magnetic gap layer of a predetermined thickness is formed in the portion on the lower head core 10 wherein a head gap is to be constituted. Thereafter, an upper head core 13 of the head magnetic circuit is formed by a magnetic thin film. On the other hand, a magnetic mid-layer 14 is formed on the lower transformer core 11 by a magnetic thin film. A non-magnetic insulating layer 15 is formed so as to bury concave portions formed due to the formation of the foregoing respective thin film patterns. The upper surface of the insulating layer 15 is polished and worked so as to obtain a flat surface as shown by the line B—B' which includes the top surface of the magnetic mid-layer 14.

In the foregoing respective thin-film production processes, a vacuum evaporated film or sputtered film of permalloy or amorphous alloy is suitable for the magnetic film portion; a vacuum evaporated film or sputtered film of Cu or Al is suitable for the coil layer; and a sputtered film of $SiO_2$ or $AlO_3$ is suitable for the insulating layer film, respectively.

The portion over the line B—B' in FIG. 5 is the upper substrate in which a non-magnetic block 16 and a bulk magnetic block 17 are joined. The magnetic portion is formed with a winding groove 18 for the transformer secondary coil. Their bottom surfaces along the line B—B' are polished so as to obtain a substantially flat surface. Glass, forsterite porcelain, barium titanate porcelain, or the like is suitable for the non-magnetic portion. Mn-Zn ferrite or the like is suitable for the magnetic block portion. The glass bonding is suitable to join the non-magnetic portion and magnetic block portion.

The upper substrate prepared in this manner and the lower substrate finished through the foregoing thin film processes are joined at the position of FIG. 5. Although a glass bonding is desirable to join them, they may be bonded using an organic adhesive agent or the like in applications where the glass bonding will adversely influence the magnetic thin layer or the like.

After the head formed in this way has been worked to have a predetermined external shape or the like, the bulk winding is provided to form a secondary coil 19 of the transformer. The secondary coil 19 is divided by the upper magnetic circuit and lower magnetic circuit of the transformer and connected so as to form a balance winding.

As will be apparent from the foregoing description of the above embodiment, the one-turn head portion is constituted by the upper head core 13, lower head core 10, and one-turn coil 12. The transformer portion is constituted by the transformer magnetic circuit comprising the bulk magnetic block 17, magnetic mid-layer 14 and lower transformer core 11, and by the one-turn coil 12 and secondary coil 19 of a plurality of turns which are in interlinkage with the transformer magnetic circuit.

The head magnetic circuit and one-turn coil portion can be formed to have the necessary minimum sizes via thin film technology, so that the one-turn inductance of the head and the DC resistance of the one-turn portion can be minimized. In addition, the transformer secondary coil is formed in the balance winding at the position near the primary coil, so that the coupling coefficient between both of the transformer coils can be increased to a value greater than the conventional one. (When all of the magnetic fluxes which interlink the primary coil also interlink the secondary coil, the coupling coefficient becomes "1").

Figure 6:
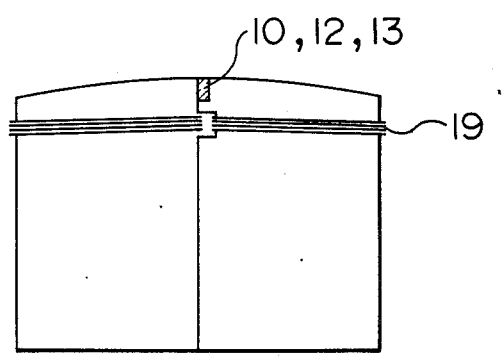
FIG. 6 is a plan view showing another embodiment of the invention.

Although the one-turn head portion is illustrated in an enlarged scale greater than the other portions in FIGS. 4 and 5 for convenience of explanation, the head will be as shown in FIG. 6 in the case where the outside appearance of the head is drawn with the actual dimensional ratio as an actual application of this head to, e.g., a video head for use in a rotary cylinder. It will be understood from FIG. 6 that the outside appearance of the head is extremely similar to that of a so-called video type head and this head can be easily applied to the recording/reproducing apparatus of the rotary head type.

Figure 7:
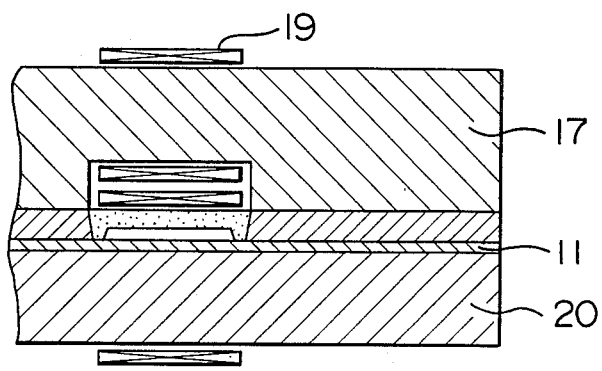
FIG. 7 is a partial cross sectional view showing still another embodiment of the invention.

Another embodiment of the present invention is as follows. FIG. 7 is a diagram showing the transformer portion, and a substrate 20 under the lower transformer core 11 is constituted by a magnetic block. In this case, the lower transformer core 11 may be omitted. Such a structure is effective in the case where the coercive force of the recording medium is large, the head drive current is large, and magnetic saturation is likely to occur. In this case, it is desirable that the magnetic substrate 20 is not elongated relative to the head front surface in order to avoid possible recording/reproducing by the magnetic substrate 20.

Figure 8:
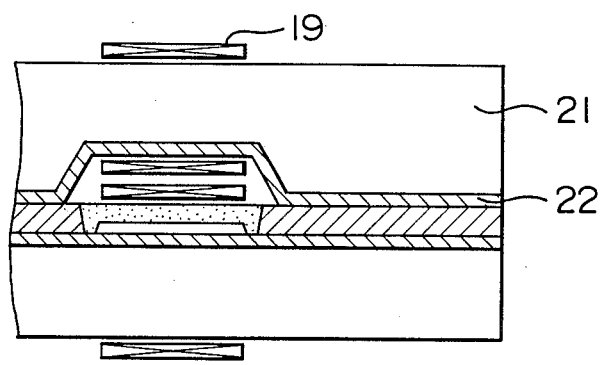
FIG. 8 is a partial cross sectional view showing still another embodiment of the invention.

In the FIG. 8 embodiment, the upper head core is constituted by a magnetic thin film 22 formed under a non-magnetic substrate 21 in which a recessed portion is formed, and all of the transformer magnetic circuit portions are formed via thin film technology. Such a structure is suitable as a magnetic head, particularly, in operation at high frequencies. In this embodiment as well, it is preferable that the magnetic film 22 is not elongated relative to the head front surface for a reason similar to that in the foregoing embodiment.

Figure 9:
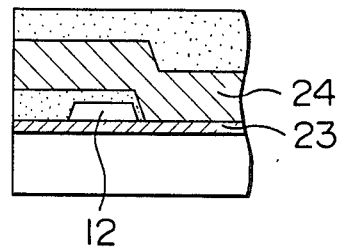
FIG. 9 is a partial cross sectional view showing still another embodiment of the invention.

Although the one-turn head portion has been constituted as a so-called ring-shaped head in each of the foregoing embodiments, alternatively, a perpendicular recording head of one turn as shown in FIG. 9 may be used. In FIG. 9, reference numeral 23 denotes a main pole for recording/reproducing; 24 is an auxiliary pole; and 12 the one-turn coil. In such a perpendicular recording head, as compared with the ring-shaped head shown in FIGS. 4 and 5, the magnetic path is substantially an open magnetic path. Therefore, when the magnetic circuit is miniaturized, a significant improvement in efficiency can typically be achieved, and there is a large effect in combining the step-up transformer by the one-turn structure.

Further, although the one-turn head portion has been shown in the above embodiments, the head may be also formed by a few turns. In this embodiment as well, the features of the invention mentioned above can be achieved. When such a coil is actually manufactured, use can be made of well-known coil forming technology using thin films.

We claim:

1. A step-up type magnetic head, comprising:
   a first plate having a planar first side surface and a second side surface which are substantially narrower than planar principal surfaces of the first plate and which define an edge at a portion thereof at which they intercept one another;
   a thin film magnetic head core formed on said first side surface of said first plate and having a substantially closed magnetic circuit including a gap, a pole tip surface of said head core extending to said edge defined by said first side surface and said second side surface;
   a plurality of thin film magnetic layers formed on said first side surface of said first plate at a position adjacent to said magnetic head core but remote from said edge defined by said first side surface and said second side surface;
   a closed-loop thin film coil formed over said thin film magnetic layers and extending through said magnetic circuit of said head core;
   a second plate having a substantially planar third side surface and a fourth side surface which are substantially narrower than planar principal surfaces of said second plate, said third side surface being provided with a groove which extends from one principal surface of said second plate to another principal surface of said second plate, said second plate having a magnetic part and a non-magnetic part, said magnetic part occupying a portion of said second plate including an entire inner wall of said groove and a part of said third side surface adjacent said groove, said non-magnetic part occupying a portion of said second plate including said fourth side surface, said magnetic part of said second plate contacting said thin film magnetic layers to form a substantially closed transformer magnetic circuit which encompasses said groove;
   a transformer secondary bulk winding, said secondary winding being divided into a first portion wound around said first plate through said groove and a second portion wound around said second plate through said groove, said first portion and said second portion of the secondary winding being connected in a balanced winding manner, said secondary winding being electromagnetically coupled with said thin film coil through said transformer magnetic circuit;
   wherein said second side surface of said first plate and said fourth side surface of said second plate form a substantially continuous operative surface of the head, said operative surface being a surface which in operation of the head for recording and/or reproduction faces a magnetic recording medium.

2. A step-up type magnetic head according to claim 1, wherein said thin film coil forms a single turn coupled with both said magnetic circuit of said head core and said transformer magnetic circuit.

3. A step-up type magnetic head according to claim 1, wherein a part of the first plate disposed under said thin film magnetic layers is formed of a bulk magnetic material.

4. A step-up type magnetic head according to claim 1, wherein said magnetic part of said second plate comprises a bulk magnetic material.

5. A step-up type magnetic head according to claim 1, wherein said magnetic part of said second plate comprises a thin film magnetic material.

* * * * *